United States Patent Office 3,639,667
Patented Feb. 1, 1972

3,639,667
1,2-DIHYDRO-1-HYDROXY-4-PHENOXY-PYRIMIDINES
Joseph J. Ursprung, Portage, and William C. Anthony, Kalamazoo, Mich., assignors to The Upjohn Company, Kalamazoo, Mich.
No Drawing. Original application Feb. 21, 1966, Ser. No. 528,790, now Patent No. 3,464,987, dated Sept. 2, 1969. Divided and this application Mar. 10, 1969, Ser. No. 805,811
Int. Cl. C07d 51/34
U.S. Cl. 260—256.4 C          6 Claims

ABSTRACT OF THE DISCLOSURE 1,2 - dihydro - 1 - hydroxy-4-phenoxypyrimidines, the corresponding acid addition salts, and the carboxylates are disclosed. These compounds are useful in the treatment of hypertension and shock.

CROSS-REFERENCE TO RELATED APPLICATIONS

This application is a division of U.S. Ser. No. 528,790 filed on Feb. 21, 1966, now issued as U.S. Pat. 3,464,987.

BACKGROUND OF THE INVENTION

Hypertensive states have long been recognized as undesirable in mammals, including humans. It has now been found that the presently claimed compounds are effective as antihypertensive agents.

SUMMARY OF THE INVENTION

Disclosed are 1,2 - dihydro - 1 - hydroxy-4-phenoxy-pyrimidines and the corresponding acid addition salts. The aforesaid compounds are substituted in the 4-position by a phenoxy group and in the 5-position by hydrogen, lower alkyl, bromo, or chloro moiety.

DETAILED DESCRIPTION OF THE INVENTION

In particular, this invention relates to novel 1,2-dihydro-1-hydroxy-2-imino - 6 - lower-alkyl - 4 - phenoxy-pyrimidines of Formula VI-A,

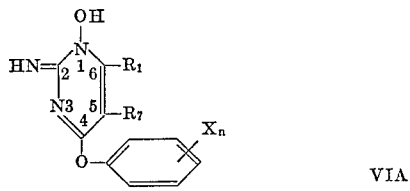

VIA and 1,6 - dihydro - 1 - hydroxy-2-lower-alkyl-6-imino-4-phenoxypyrimidines of Formula VI-B,

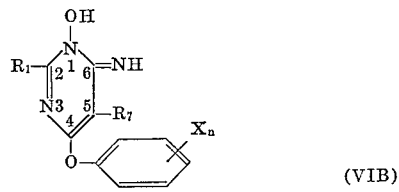

(VIB)

wherein $R_1$ is lower alkyl, $R_7$ is selected from the group consisting of hydrogen, lower alkyl, bromine and chlorine, X is fluorine, chlorine and bromine, and $n$ is zero to 3, inclusive.

The use of the above numbering system by which the positions of the pyrimidine nucleus are numbered will be followed exclusively in naming the various compounds.

It is to be understood, however, that the novel compounds of ths invention are likely to be mixtures of tautomeric forms, the compositions of which are dependent on such factors as the nature of $R_1$ and $R_7$, and the environment. In some instances, on form or another may predominate.

These novel compounds are useful not only per se for their pharmacological activity, but also as intermediates in preparing 1,2 - dihydro - 1-hydroxy-2-imino-6-lower-alkyl-pyrimidines of Formula I-A,

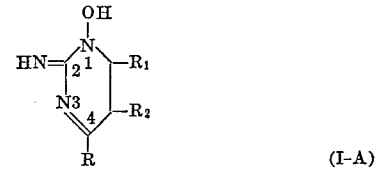

(I-A)

and 1,6 - dihydro - 1 - hydroxy - 2 - lower-alkyl-6-imino-pyrimidines of Formula I-B,

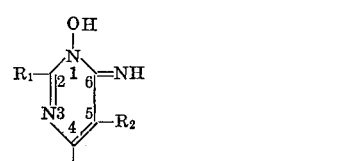

(I-B)

as disclosed in the above-identified application, now U.S. Pat. 3,464,987.

R is a moiety selected from the group consisting of moieties of the formula

wherein $R_3$ and $R_4$ are selected from the group consisting of hydrogen, lower alkyl, lower alkenyl, lower aralkyl, and lower cycloalkyl, with the proviso that both $R_3$ and $R_4$ are not hydrogen, and the heterocyclic moieties aziridinyl, azetidinyl, pyrrolidinyl, piperidino, hexahydroazepinyl, heptamethylenimino, octamethyleneimino, morpholino, and 4 - lower-alkylpiperazinyl, each of said heterocyclic moieties having attached as substituents on carbon atoms thereof zero to 3 lower alkyls, inclusive, a nitrogen atom of each of said heterocyclic moieties being the point of attachment of R to the ring in said formula. When R is

$R_3$ and $R_4$ can be alike or different. When R is a heterocyclic moiety, the alkyls which can be attached thereto can all be different or any two or all of them can be alike. $R_1$ is lower alkyl and $R_2$ is selected from the group consisting of hydrogen, lower alkyl, bromo, chloro, nitro, amino, R as defined above, and

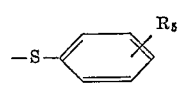

wherein $R_5$ is selected from the group consisting of hydrogen, bromo, chloro, fluoro, nitro, amino and lower alkyl.

Examples of lower alkyl are methyl, ethyl, propyl, butyl, pentyl, hexyl, heptyl, octyl, and isomeric forms thereof. Examples of lower alkenyl are allyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like. Examples of lower cycloalkyl are cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-triethylcyclobutyl, cyclopentyl, 2,2-dimethylcyclopentyl, 3-pentylcyclopentyl, 3-tert-butylcyclopentyl, cyclohexyl, 4-tert-butylcyclohexyl, 3 - isopropylcyclohexyl, 2,2 - dimethylcyclohexyl, cycloheptyl, cyclooctyl, and the like. Examples of lower aralkyl are benzyl, phenethyl, 1-phenylethyl, 2-phenylpropyl, 4-phenylbutyl, 6-pentylhexyl, 5-phenyl-2-methylpentyl, 1-naphthylmethyl, 2 - (1 - naphthyl)ethyl, 2 - (2 - naphthyl) ethyl, and the like.

The novel compounds of Formula IA or VIA are produced according to the following reaction scheme:

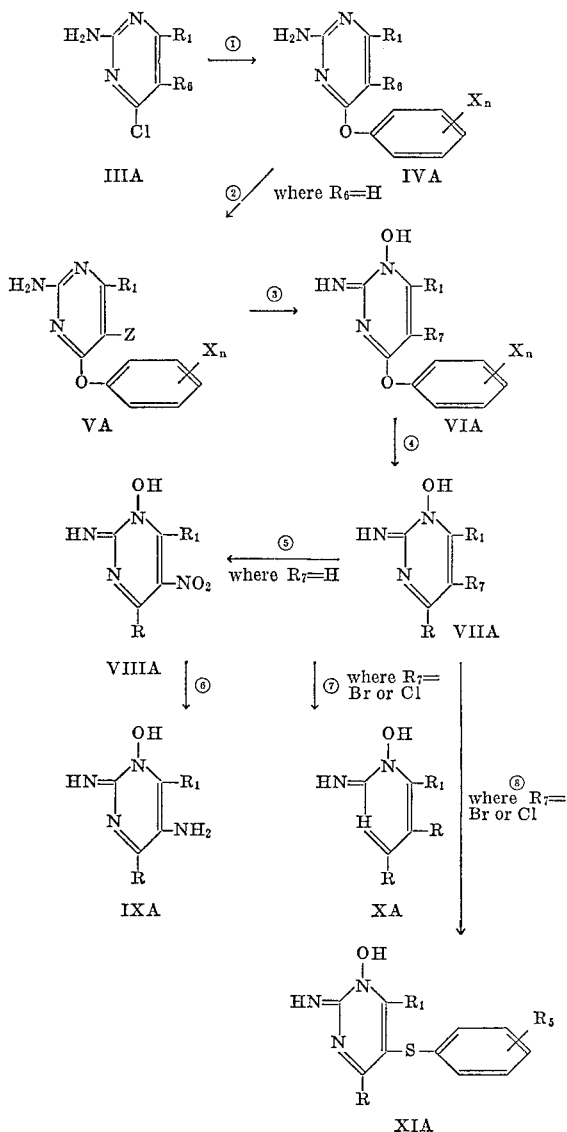

wherein R, $R_1$ and $R_5$ are defined as above, $R_6$ is selected from the group consisting of hydrogen and lower alkyl, Z is bromo and chloro, $R_7$ is selected from the group consisting of hydrogen, lower alkyl, bromine and chlorine, X is fluorine, chlorine and bromine, and $n$ is zero to 3, inclusive.

The 1,6 - dihydro-1-hydroxy-2-lower-alkyl - 6 - iminopyrimidines of Formula IB are also produced according to the reaction scheme outlined above, namely,

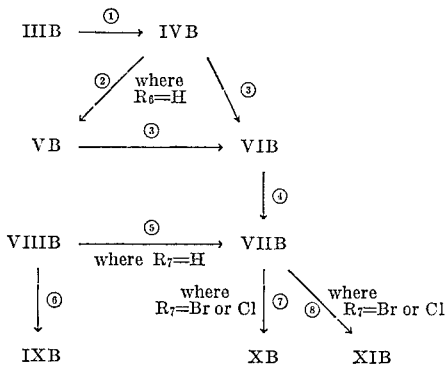

by substituting the corresponding 2-lower-alkyl-6-aminopyrimidines of Formula IIIB for the 2-amino-6-lower-alkylpyrimidines of Formula IIIA.

The starting compounds of Formula IIIA are known in the art or can be prepared according to methods well known in the art, such as the method described by Braker et al., J. Amer. Chem. Soc., 69, 3072 (1947). The starting compounds of Formula IIIB are known in the art or can be prepared according to methods well known in the art, such as the method described by Földi et al., Ber. Deut. Chem. Ges., 75, 755 (1942).

Hereinafter in the body of the specification wherever possible for convenience and brevity, reference will be made only to the A series compounds, that is, compounds in which the 6-position is occupied by a lower alkyl group, such as the 2-amino-6-lower-alkylpyrimidines (IIIA, IVA and VA), and the 1,2-dihydro - 1 - hydroxy - 2 - imino-6-lower-alkylpyrimidines (VIA) and like compounds of the A series. However, it is to be understood that reference to the A series is not to be construed as limiting the invention to these compounds. Rather, reference to the A series is also intended to be inclusive to the compounds of the B series, such as the 2-lower-alkyl-6-aminopyrimidines (IIIB, IVB and VB), and the 1,6-dihydro-1-hydroxy-2-lower-alkyl-6-iminopyrimidines (VIB) and like compounds of the B series.

The novel 1,2-dihydro - 1 - hydroxypyrimidines of Formula VIIA are produced by mixing a compound of formula:

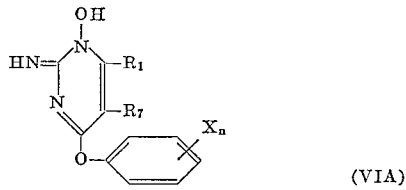

(VIA)

wherein $R_1$, $R_7$, X and $n$ are defined as above, with an amine of the formula RH wherein R is as defined above. The phenoxy moiety of the Formula VIA reactant is displaced by the R moiety of the amine (Reaction 4).

The 1,2-dihydro-1-hydroxy-4-phenoxypyrimidines of Formula VIA are novel compounds. In addition to being useful as reactants for the production of Formula VIIA 1,2-dihydro-1-hydroxypyrimidines, they are useful for various pharmacological purposes. For example, the Formula VIA compounds (and the VIB compounds) are orally and parenterally active in birds and mammals, including man, as antihypertensive agents having vasodilatory activity, and are useful for lowering blood pressure and for the treatment of shock. They are also useful as antifertility agents and antiviral agents, and as agents causing electrolyte and water retention in laboratory animals.

The novel 1,2-dihydro-1-hydroxy - 4 - phenoxypyrimidines of Formula VIA are produced by mixing a pyrimidine of the formulas:

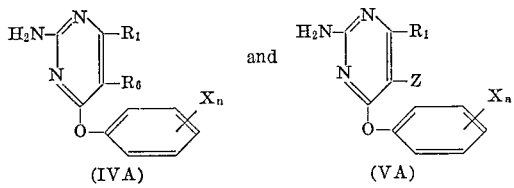

wherein X, $n$, $R_1$ Z and $R_6$ are as defined above, with a percarboxylic acid (Reaction 3). Particularly preferred for this purpose are perbenzoic acids of the formula:

(XII)

wherein W is selected from the group consisting of halogen, lower alkyl, lower alkoxy, and nitro, and $n_1$ is zero to 5, inclusive. However, other percarboxylic acids can be used for this oxidation, examples being performic acid, peracetic acid, perpropionic acid, perbutyric acid, perphthalic acid, percamphoric acid, and the like.

Pyrimidines of Formula IVA are prepared by mixing a pyrimidine of the formula:

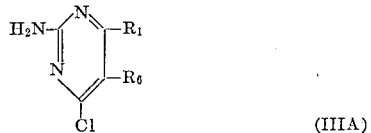

(IIIA)

wherein $R_1$ and $R_6$ are as defined above, with a phenoxide salt of a phenol of the formula:

(XIII)

wherein X and $n$ are as defined above (Reaction 1).

The novel 1,2 - dihydro - 1 - hydroxypyrimidines of Formula VIA wherein $R_7$ is chlorine or bromine are produced by the reaction sequence, IIIA (where $R_6$ is

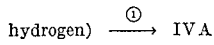

(where $R_6$ is

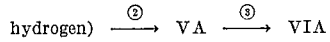

(wherein $R_7$ is chlorine or bromine), and wherein $R_1$, X, Z and $n$ are as defined above.

Suitable percarboxylic acids for the transformation (Reaction 3) of the Formula VA pyrimidines to VIA 1,2-dihydro-1-hydroxypyrimidines are those listed above as suitable for the transformation of Formula IVA (wherein $R_6$ is lower alkyl or hydrogen) pyrimidines to Formula VIA 1,2-dihydro-1-hydroxypyrimidines (wherein $R_7$ is lower alkyl or hydrogen). Especially preferred for this purpose are the above-mentioned perbenzoic acids of Formula XII. Suitable halogenation agents for converting the compounds of Formula IVA (where $R_6$ is hydrogen) to the compounds of Formula VA are the halogens themselves, i.e., chlorine and bromine, and the so-called positive halogen compounds (Reaction 2).

The term, positive halogen compounds, as used herein, refers to organic or inorganic compounds which contain chlorine or bromine with a valence number +1. Such compounds usually contain a chlorine or bromine atom bonded to some other atom, usually oxygen or nitrogen, in an inorganic or organic compound by a polar covalent bond wherein the halogen atom is the positive end of the dipole. Examples of inorganic positive halogen compounds are the hypohalous acids, e.g., hypochlorous acid and hypobromous acid, and the hypohalites, e.g., lithium, sodium, potassium, and calcium hypochlorites and hypobromites. Examples of organic positive halogen compounds are hypohalite esters, e.g., t-butyl hypochlorite; N-haloamides, e.g., N-chloroacetamide, N-bromoacetamide, N-bromobenzamide, N,p-dichloroacetanilide, N-chloro-p-nitroacetanilide, and N-chlorobenzenesulfonamide; N-haloimides, e.g., N-chlorosuccinimide, N-bromosuccinimide, and N-chlorophthalimide; and other N-halo compounds, e.g., N-bromohydantoin, 1,3 - dibromo-5,5-dimethylhydantoin, 1,3-dichloro-5,5-dimethylhydantoin, and the like. These halogenations are carried out by methods known in the art for halogenation of diaminopyrimidines. See, for example, Brown, "The Pyrimidines," Interscience Publishers, New York, pp. 169 (1962) and Phillips et al., J. Am. Chem. Soc., 74, 3922 (1952).

The Reaction, 1, between a Formula IIIA 4-chloropyrimidine and a phenoxide salt of the Formula XIII phenol is carried out by heating a mixture of the pyrimidine and the salt in the range about 100° to about 200° C., preferably in the range about 140° to about 180° C., until the desired displacement reaction takes place. Usually about one to about 10 hours of heating is sufficient, less time usually being required at higher temperature, e.g., 180° C. than at lower temperature, e.g., 140° C.

Alkali metal phenoxides, especially sodium or potassium phenoxides, are preferred although phenoxides of other metals, e.g., magnesium, calcium, and aluminum, can be used. One molecular equivalent of the phenoxide salt is required to react with each molecular equivalent of 4-chloropyrimidine, and there is usually no reason to use other than those molecular proportions. It is advantageous, however, to heat the phenoxide salt and the 4-chloropyrimidine in the presence of about one to about 10 or even more molecular equivalents of the phenol corresponding to the phenoxide salt. The phenol then serves as a diluent, and can also serve as a source of the phenoxide salt. In the latter case, one molecular equivalent of a metal hydroxide corresponding to the desired metal phenoxide salt, e.g., sodium hydroxide or potassium hydroxide, is added to sufficient Formula XIII phenol to produce the desired amount of phenoxide salt and leave enough to serve as the diluent.

In preparing the mixture of phenoxide salt and phenol diluent, it is often advantageous to add the metal hydroxide in solid form, and then remove water by a preliminary heating at about 100° C. The chloropyrimidine is then added to the phenoxidephenol mixture.

Alternatively, chloropyrimidine, metal hydroxide, and sufficient phenol to form phenoxide and to serve as a diluent are mixed together and heated.

In place of or in addition to a phenol diluent, another inert liquid diluent, for example, dimethylformamide, can be used to aid in forming a suitably mobile reaction mixture.

The desired Formula IVA 4-phenoxypyrimidine can be isolated from the reaction mixture by conventional methods, for example, by addition of sufficient aqueous alkali metal hydroxide solution to dissolve the phenol diluent, if one is used, followed by separation of the desired product by filtration or centrifugation. The phenoxypyrimidine can then be purified, if desired, by conventional methods, for example, by recrystallization from a suitable solvent or mixture of solvents.

The Reaction, 3, between a Formula IVA or VA 4-phenoxypyrimidine and a percarboxylic acid to produce a Formula VIA 1,2 - dihydro-1-hydroxy-4-phenoxypyrimidine is carried out by mixing those two reactants, preferably in the presence of an inert liquid diluent. Although, as mentioned above, percarboxylic acids generally are useful for this oxidation, it is preferred to use perbenzoic acids of Formula XII. Acids of Formula XII are known in the art or can be prepared by methods known in the art. See, for example, Braun, Organic Syntheses, Coll. vol. I, 2nd ed., 431 (1941) and Silbert et al., J. Org. Chem. 27, 1336 (1962). In Formula XII, when $n_1$ is 2 or more, the W's can be the same or different. Examples of halogen are fluorine, chlorine, bromine, and iodine. Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Illustrative oxidizing acids of Formula XII include perbenzoic acid, o-, m-, and p-chloro- and bromoperbenzoic acids, 3,5-dichloroperbenzoic acid, 2,3,5,6-tetrachloroperbenzoic acid, 4-methylperbenzoic acid, 3,4-dimethylperbenzoic acid, pentamethylperbenzoic acid, o-, m-, and p-methoxyperbenzoic acids, 3-nitroperbenzoic acid, 2,4-dinitroperbenzoic acid, 3-chloro-4-methoxyperbenzoic acid, 3-chloro-4-nitroperbenzoic acid, and the like In carrying out the reaction between the Formula IVA or VA pyrimidine and the Formula XII perbenzoic acid, the two reactants are mixed advantageously below about 50° C., preferably between about $-10°$ and $+10°$ C., although higher or lower temperatures can be used. It is preferred to mix the reactants in the presence of an inert liquid diluent and to stir the mixture until the reaction is substantially complete. The reaction usually requires about one to about 8 hours. Suitable diluents include N-lower-alkylpyrrolidones, e.g., N-methylpyrrolidone; lower alkanols, e.g., methanol, ethanol, propanol, isopropyl alcohol, the butanols and the pentanols; lower alkanol and glycol esters of lower alkanoic aicds, e.g., ethyl acetate, butyl acetate, pentyl acetate, ethylene glycol monoacetate, diethylene glycol monoacetate; ethers, e.g., diethyl ether, diisopropyl ether, ethylene glycol monoethyl ether, diethylene glycol monobutyl ether; and the like. The molecular ratio of Formula IVA or VA pyrimidine and Formula XII perbenzoic acid can be varied widely. Ratios from about 1:1 to 1:5, preferably from about 1:1.5 to 1:2.5, are suitable.

The 1,2-dihydro-1-hydroxy-4-phenoxypyrimidine of Formula VIA can be isolated from the oxidation reaction mixture by conventional techniques, for example, by successive evaporation of the reaction solvent at reduced pressure, solution of the basic Formula VIA product in aqueous acid, e.g., hydrochloric acid, removal of undesired water-soluble reaction products by filtration, neutralization of the acidic filtrate, and isolation of the Formula VIA product by filtration, extraction, or chromatography. The isolated material can be purified by conventional techniques, for example, by recrystallization from a suitable solvent or pair of solvents, or by preparation of an acid addition salt, e.g., the hydrochloride or acid phosphate, and recrystallization of the salt, followed, if desired, by reconversion of the salt to the free base in the usual manner.

Halogenation, 2, of Formula IVA (where $R_6$ is hydrogen) 4-phenoxypyrimidines is carried out by mixing the pyrimidine reactant with the halogenating agent, preferably in the presence of a diluent. For example, in the case of bromination, the pyrimidine reactant is dissolved in a diluent such as acetic acid, and the resulting solution is gradually mixed in the range about 10° to about 100° C. with one molecular equivalent of bromine, also dissolved in a diluent such as acetic acid. In some instances, it is advantageous to carry out the bromination in the presence of water, although enough organic diluent, e.g., acetic acid, should also be present to maintain a homogeneous reaction mixture. The presence of a base such as calcium carbonate, or sodium acetate where the diluent is acetic acid, to neutralize the hydrobromic acid which is formed is also desirable. In a similar manner, use of chlorine yields the corresponding Formula VA 5-chloropyrimidines.

Alternatively, one of the so-called positive halogen compounds, examples of which have been given above, can be used to halogenate a Formula IVA (where $R_6$ is hydrogen) 4-phenoxypyrimidine. For example, a mixture of a Formula IVA (where $R_6$ is hydrogen) pyrimidine reactant, one molecular equivalent of the positive halogen compound, e.g., N-chlorosuccinimide or N-bromosuccinimide, and an inert diluent, for example, carbon tetrachloride, are mixed and heated in the range about 50° to about 100° C.

The desired 5-halo-4-phenoxypyrimidines of Formula VA can be isolated from a halogenation reaction mixture by conventional methods, for example, by evaporation of the diluent, and the product can be purified, if desired, by conventional methods, for example, by recrystallization from a suitable solvent or mixture of solvents, or by chromatography.

Oxidation, 3, of the Formula VA 5-halo-4-phenoxypyrimidine with a percarboxylic acid to produce a Formula VIA 1,2-dihydro-1-hydroxy-5-halo-4-phenoxypyrimidine is carried out in the same manner described above for the percarboxylic acid oxidation of Formula IVA (where $R_6$ is hydrogen or lower alkyl) 4-phenoxypyrimidines to Formula VIA (where $R_6$ is hydrogen or lower alkyl) 1,2-dihydro-1-hydroxy-4-phenoxypyrimidines.

The 1,2-dihydro-1-hydroxypyrimidines of Formula 1A are transformed to monoacid and diacid addition salts by neutralization with appropriate amounts of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula IA amine, the acid, and the acid addition salt. If the acid is soluble in water, the basic compound of Formula IA can be dissolved in water containing either one or two equivalent amounts of the acid, and thereafter, the water can be removed by evaporation. If the acid is soluble in a relatively non-polar solvent, for example, diethyl ether or diisopropyl ether, separate solutions of the acid and the basic Formula IA compound in such a solvent can be mixed in equivalent amounts, whereupon the acid addition salt will usually precipitate because of its relatively low solubility in the non-polar solvent. Alternatively, the basic Formula IA compound can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively lower polarity, for example, diethyl ether or hexane, will usually cause precipitation of the acid addition salt. Either monoacid or diacid salts can be formed by using one or two equivalents, respectively, of the acid. Similarly, the 1,2-dihydro-1-hydroxy-4-phenoxypyrimidines of Formula VIA are converted to their acid addition salts.

Acid addition salts of Formulas IA and VIA pyrimidines can be transformed to other acid addition salts by a metathetical exchange of the original acid addition salt anion, e.g., the chloride ion, with another anion, for example, as described above with regard to the formation of penicillin salts.

As mentioned above, the novel compounds of this invention, i.e., compounds of Formulas IA, IIA and VIA (and IB, IIB and VIB), including the free bases and acid addition salts thereof, are useful as antihypertensive agents, antifertility agents, antiviral agents, anti-inflammatory agents, and as central nervous system stimulants in the treatment of birds and mammals, including man. For those purposes, especially as antihypertensive agents, said novel compounds can be used in the non-protonated (free base) form or in the protonated (acid addition salt) form either in association with a pharmaceutical carrier in solid or liquid dosage forms, such as tablets, capsules, powders, pills, granules, syrups, elixirs, suppositories, sterile aqueous or vegetable oil dispersions for parenteral use, and the like, alone or in combination with other drugs, for example, in combination with diuretics, sympathetic blocking agents, ganglion-blocking agents, peripheral vasodilators, reserpinoids, tranquilizers, sedatives, muscle relaxants, anti-histamines and other antihypertensives.

Powders are prepared by comminuting the active ingredient to a suitable fine size and mixing with a similarly comminuted diluent. The diluent can be an edible carbohydrate material such as starch. Advantageously, a sweetening agent is present as well as a flavoring agent.

Capsules are produced by preparing a powder mixture as hereinbefore described and filling into formed gelatin sheets. Advantageously, as an adjuvant to the filling operation, a lubricant such as talc, magnesium stearate and calcium stearate is added to the powder mixture before the filling operation.

Tablets are made by preparing a powder mixture, granulating or slugging, adding a lubricant and pressing into tablets. The powder mixture is prepared by mixing the active ingredient suitable comminuted, with a diluent or base such as starch, lactose, kaolin, dicalcium phosphate, calcium sulfate, and the like. The powder mixture can be granulated by wetting with a binder such as syrup, gelatin solution, methylcellulose solution or acacia mucilage and forcing through a screen. As an alternative to wet granulating, the powder mixture can be slugged, i.e., run through a tablet machine and the resulting large tablets broken down into granules. The granules are further lubricated to prevent sticking to the tablet-forming dies by means of the addition of stearic acid, a stearate salt, talc, or mineral oil. The lubricated mixture is then compressed into tablets.

Advantageously, the tablet can be provided with a protective coating consisting of a sealing coat of shellac, a coating of sugar and methylcellulose,, and a polish coating of carnauba wax.

Oral fluids are prepared in unit dosage forms such as syrups and elixirs wherein each teaspoonful of composition contains a predetermined amount of active ingredient for administration.

A syrup is prepared by dispersing the active ingredient in a suitably flavored aqueous sucrose solution. Similarly an elixir is prepared utilizing an aqueous-alcoholic vehicle. Elixirs are advantageous vehicles for use when a therapeutic agent, which is not sufficiently water-soluble, is in the composition.

For parenteral administration aqueous fluid unit dosage forms can be prepared. In preparing the parenteral form, a measured amount of active ingredient is placed in a vial, and the vial and its contents are sterilized and sealed. An accompanying vial of sterile water for injection is provided as a vehicle to form a dispersion prior to administration. Advantageously, the sterile water can have dissolved therein a local anesthetic and buffering agent. Parenteral aqueous solutions can also be made by utilizing a pharmacologically acceptable salt of the active ingredient, such as those mentioned above.

Alternatively, a parenteral suspension can be prepared by suspending the active ingredient in a parenterally acceptable vegetable oil with or without additional adjuvants, and sterilizing after filling into vials.

For veterinary oral use the active ingredient is conveniently prepared in the form of a food premix. The food premix can comprise the active ingredient in admixture with an edible pharmaceutical diluent such as starch, oatmeal, flour, calcium carbonate, talc, dried fish meal, and the like. The prepared premix is then conveniently added to the regular feed, thereby providing medication to the animal in the course of feeding.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use in humans and animals, as disclosed in detail in the specification, these being features of the present invention. Examples of suitable unit dosage forms in accord with this invention are tablets, capsules, pills, powder packets, granules, wafers, cachets, suppositories, segregated multiples of any of the foregoing, and other forms as herein described.

The amount of active ingredient that is to be administered depends on the age, weight of the patient, the particular condition to be treated, the frequency of administration, and the route of administration. The dose range is from about 0.1 to about 30 mg. per kg. of body weight, preferably about 0.3 to about 10 mg. per kg. of body weight. The human dose ranges from about 5 to about 500 mg. daily given as a single dose or in 3 or 4 divided doses; preferably, the adult dose is from 25 to about 200 mg. Veterinary dosages will correspond to human dosages with amounts administered being in proportion to the weight of the animal as compared to adult humans.

The active ingredient is compounded with a suitable pharmaceutical diluent in unit dosage form, either alone or in combination with other active ingredients. The amount of such other active ingredients is to be determined with reference to the usual dosage of each such ingredient. Thus the novel compounds of the invention can be combined with other hypotensive agents such as α-methyldopa 100–250 mg.; with diuretics such as aminophylline 100–200 mg., bendroflumethiazide 2.5–5 mg., hydrochlorthiazide 10–50 mg., trichlormethiazide 2–4 mg., triamterene 25–100 mg., ethoxzolamide 50–250 mg., amisometradine 200–400 mg., spironolactone 25–100 mg.; sympathetic blocking agents such as guanethidine sulfate 10–50 mg., bethanidine sulfate 5–20 mg.; ganglion-blocking agents such as pentolinium bitatrate 20–200 mg., mecamylamine hydrochloride 2.5–5 mg., hexamethonium chloride 125–250 mg., chlorisondamine chloride 25–100 mg.; peripheral vasodilators such as hydralazine 10–100 mg., beta-pyridyl carbinol 50–150 mg., mebutamate 100–300 mg.; reserpine type drugs such as reserpine 0.1–1 mg., alseroxylon 2–4 mg., syrosingopine 0.5–2 mg., deserpidine 0.1–1 mg.; tranquilizers such as meprobamate 200–400 mg., ectylurea 100–300 mg., chlordiazepoxide hydrochloride 5–20 mg., promazine hydrachloride 25–150 mg., diazepan 2–10 mg.; sedatives such as phenobarbital 8–60 mg., methyprylon 50–100 mg., amobarbital 20–40 mg., ethchlorvynol 100–200 mg.; muscle relaxants such as papaverine hydrochloride 20–100 mg., carisoprodol 200–400 mg., phenaglycodol 200–400 mg.

As has been stated above, reference to the A series compounds, namely, IIIA, IVA, VA, VIA, VIIA, VIIIA, IXA, XA and XIA, in the body of the specification is not to be construed as limiting. Rather, it is to be construed as inclusive of the B series of compounds, namely, IIIB, IVB, VB, VIB, VIIB, VIIIB, IXB, XB and XIB, in which the lower alkyl group $R_1$ is in the 2-position, rather than the 6-position.

The following examples illustrate the best mode contemplated by the inventors for carrying out their invention.

EXAMPLE 1

2-amino-6-methyl-4-phenoxypyrimidine

A mixture of 28.6 g. (0.2 mole) of 2-amino-6-methyl-4-chloropyrimidine, 94 g. (1.0 mole) of phenol and 13.2 g. (0.2 mole) of solid 85% potassium hydroxide was heated at 95–100° C. for 2 hours and a solution of 60.0 g. of potassium hydroxide in 600 ml. of water was added with stirring. The thus-obtained mixture was cooled to room temperature and filtered. The solid was washed with water and recrystallized from 700 ml. of methanol to yield 31.5 g. (79% of theory) of 2-amino-6-methyl-4-phenoxypyrimidine; M.P. 192° to 194° C. [J. Org. Chem. 17, 1457 (1952) gives M.P. 194° to 195° C.]

U.V. (ethanol) 227 m$\mu$ ($\epsilon$=14,170); 280 m$\mu$ ($\epsilon$=6870). (0.01 N alc. $H_2SO_4$) sh. 220 m$\mu$ ($\epsilon$=16,450); 278 m$\mu$ ($\epsilon$=7480). 0.01 N alc. KOH) 227 m$\mu$ ($\epsilon$=14,170; 280 m$\mu$ ($\epsilon$=6870).

I.R. (principal bands; mineral oil mull) 3340, 3180, 1650, 1575, 1485, 1210, 1185, 790, 760, 680 cm.$^{-1}$.

Following the procedure of Example 1, but using in place of phenol, 2,4-dichlorophenol; p-chlorophenol; p-bromophenol; 2,4-dibromophenol; m-fluorophenol; 2,4,6-trichlorophenol, and the like, there are obtained 2-amino-6-methyl-4-(2,4-dichlorophenoxy)pyrimidine;
2-amino-6-methyl-4-(p-chlorophenoxy)pyrimidine;
2-amino-6-methyl-4-(p-bromophenoxy)pyrimidine;
2-amino-6-methyl-4-(2,4-dibromophenoxy)pyrimidine;
2-amino-6-methyl-4-(m-fluorophenoxy)pyrimidine;
2-amino-6-methyl-4-(2,4,6-trichlorophenoxy)pyrimidine;

and the like, respectively,

Similarly, substituting for example,
2-amino-6-ethyl-4-chloropyrimidine;
2-amino-6-propyl-4-chloropyrimidine;
2-amino-6-tert-butyl-4-chloropyrimidine;
2-amino-6-octyl-4-chloropyrimidine;
2-amino-5,6-dimethyl-4-chloropyrimidine;
2-amino-5-methyl-6-ethyl-4-chloropyrimidine;
2-amino-5-octyl-6-propyl-4-chloropyrimidine;
2-amino-5-tert-butyl-6-propyl-4-chloropyrimidine, and the like, for 2-amino-6-methyl-4-chloropyrimidine and following the procedure of Example 1, part A, is productive of 2-amino-6-ethyl-4-phenoxypyrimidine;
2-amino-6-propyl-4-phenoxypyrimidine;
2-amino-6-tert-butyl-4-phenoxypyrimidine;
2-amino-6-octyl-4-phenoxypyrimidine;
2-amino-5,6-dimethyl-4-phenoxypyrimidine;
2-amino-5-methyl-6-ethyl-4-phenoxypyrimidine;
2-amino-5-octyl-6-propyl-4-phenoxypyrimidine;
2-amino-5-tert-butyl-6-propyl-4-phenoxypyrimidine;

and the like, respectively.

Also following the procedure of Example 1, but using in place of the combination of the 2-amino-6-methyl-4-chloropyrimidine and the phenol, each of the specific 2-amino - 6 - lower-alkyl-4-chloropyrimidines and 2-amino-5,6-di-lower-alkyl-4-chloropyrimidines mentioned above, and each of the specific halophenols mentioned above, there are obtained the corresponding 2-amino-6-lower-alkyl - 4 - phenoxypyrimidines, 2-amino-6-lower-alkyl-4-halophenoxypyrimidines, 2 - amino-5,6-di-lower-alkyl-4-phenoxypyrimidines and 2 - amino-5,6-di-lower-alkyl-4-halophenoxypyrimidines.

EXAMPLE 2

1,2-dihydro-1-hydroxy-2-imino-6-methyl-4-phenoxypyrimidine

A solution of 14.2 g. (0.66 mole) of 2-amino-6-methyl-4-phenoxypyrimidine and 0.14 mole of peracetic acid in 150 ml. of acetic acid was heated at 58° C. for 20 hours. The thus-obtained solution was concentrated to a syrup at 58° C. under reduced pressure, dissolved in water, followed by pH adjustment to 9 and filtering. The thus-obtained solid was heated in 5% ethanol and filtered, the filtrate was cooled to 5° C., and kept at that temperature for about 12 hours and filtered to yield 4.0 g. (28% of theory) of 1,2-dihydro-1-hydroxy-2-imino-6-methyl-4-phenoxypyrimidine as the hydrate. After drying over phosphorous pentoxide 1,2 - dihydro - 1-hydroxy-2-imino-6-methyl-4-phenoxypyrimidine was obtained; M.P. 190°–193° C.

Analysis.—Calcd. for $C_{11}H_{11}N_3O_2$ (percent): C, 60.81; H, 5.10; N, 19.34; O, 14.73. Found (percent): C, 60.49; H, 5.21; N, 18.79; O, 15.63.

U.V. (ethanol) sl. sh. 220 m$\mu$ ($\epsilon$=17,790); 255 m$\mu$ ($\epsilon$=7590); 316 m$\mu$ ($\epsilon$=7280). (0.01 N alc. $H_2SO_4$) sh. 223 m$\mu$ ($\epsilon$=14,320); sh. 262 m$\mu$ ($\epsilon$=4040); 285 m$\mu$ ($\epsilon$=6070); sh. 318 m$\mu$ ($\epsilon$=1903). (0.01 N alc. KOH) 265 m$\mu$ ($\epsilon$=7900); 316 m$\mu$ ($\epsilon$=6870).

I.R. (principal bands; mineral oil mull) 3360, 3040, 1660, 1650, 1600, 1585, 1560, 1490 cm.$^{-1}$.

Following the procedure of Example 2, but using in place of peracetic acid, in separate experiments, m-chloroperbenzoic acid; perbenzoic acid; perphthalic acid; 2,4-dichloroperbenzoic acid; p-methylperbenzoic acid; m-nitroperbenzoic acid; and p-methoxyperbenzoic acid, the same product, 1,2-dihydro-1-hydroxy-2-imino-6-methyl-4-phenoxypyrimidine, is obtained.

Similarly, substituting for example,
2-amino-6-ethyl-4-phenoxypyrimidine;
2-amino-6-propyl-4-phenoxypyrimidine;
2-amino-6-tert-butyl-4-phenoxypyrimidine;
2-amino-6-octyl-4-phenoxypyrimidine;
2-amino-5,6-dimethyl-4-phenoxypyrimidine;
2-amino-5-methyl-6-ethyl-4-phenoxypyrimidine;
2-amino-5-octyl-6-propyl-4-phenoxypyrimidine;
2-amino-5-tert-butyl-6-propyl-4-phenoxypyrimidine;

and the like, for 2-amino-6-methyl-4-phenoxypyrimidine, and following the procedure of Example 1, is productive of 1,2-dihydro-1-hydroxy-2-imino-6-ethyl-4-phenoxypyrimidine,
1,2-dihydro 1-hydroxy-2-imino-6-propyl-4-phenoxypyrimidine,
1,2-dihydro-1-hydroxy-2-imino-6-tert-butyl-4-phenoxypyrimidine,
1,2-dihydro-1-hydroxy-2-imino-6-octyl-4-phenoxypyrimidine,
1,2-dihydro-1-hydroxy-2-imino-5,6-dimethyl-4-phenoxypyrimidine,
1,2-dihydro-1-hydroxy-2-imino-5-methyl-6-ethyl-4-phenoxypyrimidine,
1,2-dihydro-1-hydroxy-2-imino-5-octyl-6-propyl-4-phenoxypyrimidine,
1,2-dihydro-1-hydroxy-2-imino-5-tert-butyl-6-propyl-4-phenoxyprimidine, and the like, respectively.

Also following the procedure of Example 2 but using in place of 2-amino-6-methyl-4-phenoxypyrimidine, each of the other 2-amino-6-lower-alkyl-4-phenoxypyrimidines, 2-amino-6-lower-alkyl - 4 - halophenoxypyrimidines, 2-amino-5,6-di-lower-alkyl - 4 - phenoxypyrimidines, and 2-amino-5,6 - di-lower-alkyl - 4 - halophenoxypyrimidines, there are obtained the corresponding 1,2-dihydro-1-hydroxy-2-imino - 6 - lower-alkyl - 4 - phenoxypyrimidines, 1,2 - dihydro - 1 - hydroxy-2-imino-6-lower-alkyl-4-halophenoxypyrimidines, 1,2 - dihydro - 1 - hydroxy-5,6-di-lower-alkyl - 4 - phenoxypyrimidines and 1,2-dihydro-1-hydroxy-5,6-di-lower-alkyl - 4 - halophenoxypyrimidines.

EXAMPLE 3

1,2-dihydro-1-hydroxy-2-imino-6-methyl-4-piperidino-pyrimidine

A mixture of 20 ml. of piperidine, 0.96 g. (0.0046 mole) of sodium and 0.005 g. (0.00002 mole) of ferric chloride was stirred until solution was complete and 1.0 g. (0.0046 mole) of 1,2-dihydro - 1 - hydroxy-2-imino-6-methyl-4-phenoxypyrimidine was added. This mixture was slowly heated to reflux over 1.5 hours, maintained at reflux for 2 hours, 1 ml. of ethanol was added and the mixture was cooled and filtered, concentrated to dryness, the residue chromatographed on two 19 x 19/1 mm. plates of silicagypsum using a 50% ethyl acetate-methanol mixture. The solids in the middle chromatographic zone were removed and continuously extracted with chloroform. The chloroform solution was concentrated to dryness at 60° C. to yield 0.7 g. of material, which after recrystallization from acetonitrile yielded 0.4 g. (41% of theory) of 1,2-dihydro-1-hydroxy-2-imino - 6 - methyl-4-piperidinopyrimidine.

*Analysis.*—Calcd. for $C_{10}H_{16}N_4O$ (percent): C, 57.67; H, 7.75; N, 26.90; O, 7.68. Found (percent): C, 58.10; H, 7.32; N, 26.19; O, 6.98.

U.V. (water) 211 m$\mu$ ($\epsilon$=26,250); 264 m$\mu$ ($\epsilon$=13,740); 391 m$\mu$ ($\epsilon$=10,480). (0.01 N $H_2SO_4$) 211 m$\mu$ ($\epsilon$=21,800); sh 240 m$\mu$ ($\epsilon$=10,880); 250 m$\mu$ ($\epsilon$=12,070); 286 m$\mu$ ($\epsilon$=11,960). (0.01 N KOH) 211 m$\mu$ ($\epsilon$=25,600); 264 m$\mu$ ($\epsilon$=13,780); 319 m$\mu$ ($\epsilon$=10,600).

I.R. (principal bands; mineral oil mull) 3370, 3240, 3040, 1640, 1630, 1615, 1525, 1435, 1250, 1175, 1105, 1080 cm.$^{-1}$.

EXAMPLE 4

(1) 2-amino-6-methyl-4-(2,4-dichlorophenoxy)pyrimidine 57.2 g. (0.4 mole) of 2 - amino - 6 - methyl-4-chloropyrimidine was added to a stirred mixture of 26.4 g. (0.4 mole) of 85% potassium hydroxide and 326 g. (2.0 moles) of 2,4-dichlorophenol at 50° C. The reaction mixture was stirred at 90–100° C. for 2.5 hours, diluted with a solution of 120 g. of potassium hydroxide and 1000 ml. of water, cooled to room temperature and filtered. The solid thus-obtained was washed with water, extracted with 3000 ml. of methanol, and slurried 1 hr. in 1000 ml. of water to yield 76.0 g. (54.4% of theory) of 2-amino-6-methyl - 4 - (2,4 - dichlorophenoxy)pyrimidine; M.P. 195°–196° C.

*Analysis.*—Calcd. for $C_{11}H_9Cl_2N_3O$ (percent): C, 48.91; H, 3.36; Cl, 26.25; N, 15.55; O, 5.92. Found (percent): C, 49.21; H, 3.34; Cl, 26.81; N, 15.05; O, 5.05.

U.V. (ethanol) 223 m$\mu$ ($\epsilon$=20,650); sh. 276 m$\mu$ ($\epsilon$=7380); 281 m$\mu$ ($\epsilon$=7710). (0.01 N $H_2SO_4$) 219 m$\mu$ ($\epsilon$=25,980); 276 m$\mu$ ($\epsilon$=7765); 283 m$\mu$ ($\epsilon$=8440). (0.01 N KOH) 224 m$\mu$ ($\epsilon$=19,830); sh. 275 m$\mu$ ($\epsilon$=6580); 281 m$\mu$ ($\epsilon$=7730).

I.R. (principal bands; mineral oil mull) 3476, 3288, 3135, 1650, 1595, 1570, 1500, 1254, 1230, 1170, 1095, 1055, 856, 818, 793 cm.$^{-1}$.

(2) 2-amino-6-methyl-4-(2,4-dichlorophenoxy)pyrimidine

A mixture of 225 g. (1.57 moles) of 2-amino-6-methyl-4-chloropyrimidine, 489 g. (3.0 moles) of 2,4-dichlorophenol, 500 ml. of dimethylformamide and 105 g. (1.57 moles) of 85% potassium hydroxide was heated at 90°–100° C. for 3 hours. The reaction mixture was poured into a solution of 105 g. of potassium hydroxide and 2000 ml. of water, stirred for 1 hour and filtered. The thus-obtained solid was washed thoroughly with water, extracted with 4000 ml. of ethanol, filtered and dried to yield 265.1 g. (67% of theory) of 2-amino-6-methyl-4-(2,4-dichlorophenoxy)pyrimidine; M.P. 195°–196° C.

EXAMPLE 5

(1) 1,2-dihydro-1-hydroxy-2-imino-6-methyl-4-(2,4-dichlorophenoxy)pyrimidine

A solution of 27 g. (0.1 mole) of 2-amino-6-methyl-4-(2,4-dichlorophenoxy)pyrimidine and 0.1 mole of peracetic acid in 100 ml. of acetic acid was heated at 60° C. for 20 hours. The reaction mixture was filtered and the filtrate was concentrated to a syrup, which was shaken with water and filtered. The thus-obtained solid was washed with water and recrystallized from 2000 ml. of 50% ethanol to give 17.2 g. (60% of theory) of 1,2-dihydro-1-hydroxy-2-imino - 6 - methyl - 4 - (2,4-dichlorophenoxy)pyrimidine; M.P. slight darkening at 185° C., melted with decomposition at 207°–208° C. Recrystallization from acetonitrile raised the M.P. to 216°–218° C.

*Analysis.*—Calcd. for $C_{11}H_9Cl_2N_3O_2$ (percent): C, 46.34; H, 3.18; Cl, 24.87; N, 14.74. Found (percent): C, 47.59; H, 3.59; Cl, 25.88; N, 14.08.

U.V. (ethanol) 257.5 m$\mu$ ($\epsilon$=7335); 281 m$\mu$ ($\epsilon$=2920); 315 m$\mu$ ($\epsilon$=6130). (0.01 N alc. $H_2SO_4$) f. 274 m$\mu$ ($\epsilon$=5530); 282 m$\mu$ ($\epsilon$=6520); f. 292 m$\mu$ ($\epsilon$=5840). (0.01 N KOH) 256 m$\mu$ ($\epsilon$=7840); 281 m$\mu$ ($\epsilon$=3160); 316 m$\mu$ ($\epsilon$=6820).

I.R. (principal bands; mineral oil mull) 3330, 3080, 1631, 1600, 1568, 1259, 1230, 1187, 1185, 1060, 855, 815 cm.$^{-1}$.

(2) 1,2-dihydro-1-hydroxy-2-imino-6-methyl-4-(2,4-dichlorophenoxy)pyrimidine

A mixture of 28.0 g. (0.1 mole) of 2-amino-6-methyl-4-(2,4-dichlorophenoxypyrimidine, 600 ml. of acetone and 100 ml. of ethanol was cooled to 0° C. and 34.4 g. (0.2 mole) of m-chloroperbenzoic acid was added over a 15-minute interval. The entire mixture was stirred for 4 hours and poured into a solution of 1 equivalent of potassium hydroxide and 1500 ml. of water, refrigerated overnight and filtered. The thus-obtained solid was refluxed in 1500 ml. of acetonitrile, allowed to cool and filtered to yield 17.9 g. (64% of theory) of 1,2-dihydro-1-hydroxy-2-imino-6-methyl - 4 - (2,4-dichlorophenoxy)pyrimidine; M.P. 216°–218° C.

EXAMPLE 6

2-amino-5,6-dimethyl-4-(2,4-dichlorophenoxy)pyrimidine

A mixture of 62.8 g. (0.4 mole) of 2-amino-5,6-dimethyl-4-chloropyrimidine and 195 g. (1.2 moles) of 2,4-dichlorophenol was heated to 65° C. and 26.4 g. (0.4 mole) of 85% potassium hydroxide was added thereto. The reaction mixture was heated at 95°–100° C. for 3 hours, 100 ml. of dimethylformamide was added thereto, followed by cooling to about 60° C., after which a solution of 1500 ml. of water and 56 g. of potassium hydroxide was added. This mixture was allowed to stand overnight and filtered. The solid was washed 4 times with 800-ml. portions of water, dried in air, and recrystallized from 1000 ml. of 95% ethanol to yield 70.1 g. (61% of theory) of 2-amino-5,6-dimethyl - 4-(2,4-dichlorophenoxy)pyrimidine; M.P. 157°–158° C.

*Analysis.*—Calcd. for $C_{12}H_{11}Cl_2N_3O$ (percent): C, 50.72; H, 3.90; Cl, 24.96; N, 14.79. Found (percent): C, 51.23; H, 4.61; Cl, 25.06; N, 14.68.

U.V. (ethanol) 222 m$\mu$ ($\epsilon$=19,550); sl. sh. 276 m$\mu$ ($\epsilon$=6300); 284 m$\mu$ ($\epsilon$=7750). (0.01 N $H_2SO_4$) sh. 218 m$\mu$ ($\epsilon$=25,500); sh. 224 m$\mu$ ($\epsilon$=23,300); sh. 274 m$\mu$ ($\epsilon$=6350); 282 m$\mu$ ($\epsilon$=8250); 289 m$\mu$ ($\epsilon$=8600); sl. sh. 301 m$\mu$ ($\epsilon$=6350). (0.01 N KOH) 222 m$\mu$ ($\epsilon$=19,600); sh. 226 m$\mu$ ($\epsilon$=19,350); sh. 274 m$\mu$ ($\epsilon$=6200); 284 m$\mu$ ($\epsilon$=7850).

I.R. (principal bands; mineral oil mull) 3480, 3290, 3140, 1645, 1585, 1570, 1260, 1235, 1100, 855, 815, 770 cm.$^{-1}$.

EXAMPLE 7

1,2-dihydro-1-hydroxy-2-imino-5,6-dimethyl-4-(2,4-dichlorophenoxy)pyrimidine

A mixture of 56.8 g. (0.2 mole) of 2-amino-5,6-dimethyl-4-(2,4-dichlorophenoxy)pyrimidine and 1500 ml. of methanol was cooled to 0° C. and 41.04 g. (0.24 mole) of m-chloroperbenzoic acid was added over 1.5 hours. The reaction mixture was stirred for an additional 3 hours, concentrated to about 400 ml. under reduced pressure, and mixed with a solution of 1500 ml. of water and 17 g. of potassium hydroxide. This mixture was allowed to stand overnight and filtered. The solid was recrystallized from 1500 ml. of acetonitrile to yield 27.5 g. (46% of theory) of 1,2-dihydro-1-hydroxy-2-imino-5,6-dimethyl-4-(2,4-dichlorophenoxy)pyrimidine; M.P. 225°–226° C.

*Analysis.*—Calcd. for $C_{12}H_{11}Cl_2N_3O_2$ (percent): C, 48.00; H, 3.69; Cl, 23.62; N, 13.99. Found (percent): C, 47.86; H, 3.78; Cl, 23.68; N, 13.64.

U.V. (ethanol) sh. 210 m$\mu$ ($\epsilon$=28,800); 246 m$\mu$ ($\epsilon$=8500); 274 m$\mu$ ($\epsilon$=2000); 313 m$\mu$ ($\epsilon$=8500). (0.01 N $H_2SO_4$) 218 m$\mu$ ($\epsilon$=25,300); sh. 226 m$\mu$ ($\epsilon$=21,600); sh. 274 m$\mu$ ($\epsilon$=4200); 296 m$\mu$ ($\epsilon$=7200). (0.01 N KOH) 218 m$\mu$ ($\epsilon$=29,250); 253 m$\mu$ ($\epsilon$=8300); 282 m$\mu$ ($\epsilon$=1900); 321 m$\mu$ ($\epsilon$=8350).

I.R. (principal bands; mineral oil mull) 3410, 3370, 3280, 1650, 1560, 1230, 1210, 1085, 900 cm.$^{-1}$.

EXAMPLE 8

2-amino-6-methyl-5-bromo-4-(2,4-dichlorophenoxy) pyrimidine

A mixture of 59.7 g. (0.3 mole) of impure 2-amino-6-methyl-4-(2,4-dichlorophenoxy)pyrimidine, 52.8 g. (0.3 mole) of N-bromosuccinimide, and 600 ml. of carbon tetrachloride was refluxed for 1 hour and then concentrated to dryness. The solid was washed with water and filtered and after 3 recrystallizations from methanol yielded 33.0 g. (31% of theory) of 2-amino-6-methyl-5-bromo-4-(2,4-dichlorophenoxy)pyrimidine; M.P. 155°–156.5° C.

*Analysis.*—Calcd. for $C_{11}H_8BrCl_2N_3O$ (percent): C, 37.85; H, 2.31; N, 12.04. Found (percent): C, 37.65; H, 2.30; N, 12.49.

U.V. (ethanol) sh. 220 m$\mu$ ($\epsilon$=18,000); sh. 283 m$\mu$ ($\epsilon$=5100); 294 m$\mu$ ($\epsilon$=5900). (0.01 N $H_2SO_4$) sh. 218 m$\mu$ ($\epsilon$=19,980); 226 m$\mu$ ($\epsilon$=19,340); sh. 238 m$\mu$ ($\epsilon$=15,940); 296 m$\mu$ ($\epsilon$=6080). (0.01 N KOH) 226 m$\mu$ ($\epsilon$=19,650); sh. 242 m$\mu$ ($\epsilon$=14,290); sh. 282 m$\mu$ ($\epsilon$=5410); 293 m$\mu$ ($\epsilon$=6510).

I.R. (principal bands; mineral oil mull) 3480, 3280, 3140, 1640, 1585, 1560, 1250, 1235, 1100, 1000, 855, 820 cm.$^{-1}$.

Following the procedure of Example 8, but substituting for the N-bromosuccinimide, N-chlorosuccinimide, there is obtained the corresponding 2-amino-6-methyl-5-chloro-4-(2,4-dichlorophenoxy)pyrimidine.

Also following the procedure of Example 8, but substituting other 2-amino-6-lower-alkyl-4-phenoxypyrimidines and 2-amino-6-lower-alkyl-4-halophenoxypyrimidines, such as 2-amino-6-ethyl-4-phenoxypyrimidine;
2-amino-6-propyl-4-phenoxypyrimidine;
2-amino-6-tert-butyl-4-phenoxypyrimidine;
2-amino-6-octyl-4-phenoxypyrimidine;

and the like, and 2-amino-6-ethyl-4-(2,4-dichlorophenoxy)pyrimidine;
2-amino-6-propyl-4-(2,4-dichlorophenoxy)pyrimidine;
2-amino-6-tert-butyl-4-(2,4-dichlorophenoxy)pyrimidine;
2-amino-6-octyl-4-(2,4-dichlorophenoxy)pyrimidine;

and the like, for 2-amino - 6 - methyl-4-(2,4-dichlorophenoxy)pyrimidine; there are obtained the corresponding 5-bromo compounds, such as 2-amino-6-ethyl-5-bromo-4-phenoxypyrimidine;
2-amino-6-propyl-5-bromo-4-phenoxypyrimidine;
2-amino-6-tert-butyl-5-bromo-4-phenoxypyrimidine;
2-amino-6-octyl-5-bromo-4-phenoxypyrimidine;

and the like, and 2-amino-6-ethyl-5-bromo-4-(2,4-dichlorophenoxy) pyrimidine;
2-amino-6-propyl-5-bromo-4-(2,4-dichlorophenoxy) pyrimidine;
2-amino-6-tert-butyl-5-bromo-4-(2,4-dichlorophenoxy) pyrimidine;
2-amino-6-octyl-5-bromo-4-(2,4-dichlorophenoxy) pyrimidine;

and the like, respectively.

Likewise, by reacting the appropriate 2-amino-6-lower-alkyl-4-phenoxypyrimidines and 2-amino-6-lower-alkyl-4-halophenoxypyrimidines with N-chlorosuccinimide there are obtained 2-amino-6-lower-alkyl-5-chloro-4-phenoxypyrimidines and 2-amino - 6 - lower-alkyl-5-chloro-4-halophenoxypyrimidines.

EXAMPLE 9

1,2-dihydro-1-hydroxy-2-imino-6-methyl-5-bromo-4-(2,4-dichlorophenoxy)pyrimidine A solution of 22.0 g. (0.062 mole) of 2-amino-6-methyl-5-bromo-4-(2,4-dichlorophenoxy)pyrimidine, 400 ml. of acetone and 100 ml. of ethanol was cooled to 0° C. and 24.0 g. (0.14 mole), of m-chloroperbenzoic acid was added over a 25-minute period. The reaction mixture was stirred at 0°–5° C. for 4 hours and filtered into a solution of 1500 ml. of water containing 0.14 mole of 85% potassium hydroxide. The thus-obtained mixture was stirred and filtered. The thus-obtained solid was washed with 600 ml. of acetonitrile to yield 19.0 g. (84% of theory) of 1,2-dihydro - 1 - hydroxy - 2 - imino-6-methyl-5-bromo-4-(2,4-dichlorophenoxy)pyrimidine; M.P. 212°–214° C.

*Analysis.*—Calcd. for $C_{11}H_8BrCl_2N_3O_2$ (percent): C, 36.19; H, 2.21; N, 11.51. Found (percent): C, 36.56; H, 2.54; N, 12.07.

U.V. (ethanol) sh. 236 m$\mu$ ($\epsilon$=22,810); 264 m$\mu$ ($\epsilon$=9125); sh. 281 m$\mu$ ($\epsilon$=3650); 333 m$\mu$ ($\epsilon$=7885). (0.01 N $H_2SO_4$) 226 m$\mu$ ($\epsilon$=22,920); 263 m$\mu$ ($\epsilon$=7485); 329 m$\mu$ ($\epsilon$=6130). (0.01 N KOH) 226 m$\mu$ ($\epsilon$=22,375); 263 m$\mu$ ($\epsilon$=9670); 334 m$\mu$ ($\epsilon$=7520).

I.R. (principal bands; mineral oil mull) 3330, 3000, 1650, 1625, 1588, 1560, 1495, 1230, 1180, 1095, 1055, 1015, 860, 850, 835, 805 cm.$^{-1}$.

Following the procedure of Example 9, but using in place of m-chloroperbenzoic acid, in separate experiments, peracetic acid; perbenzoic; perphthalic acid; 2,4-dichlorobenzoic acid; p-methylperbenzoic acid; m-nitroperbenzoic acid, and p-methoxyperbenzoic acid, the same product, 1,2-dihydro - 1 - hydroxy - 2 - imino-6-methyl-5-bromo-4-(2,4-dichlorophenoxy)pyrimidine, is obtained.

Also following the procedure of Example 9, but substituting other 2-amino - 6 - lower-alkyl-5-bromo-4-phenoxypyrimidines, and 2-amino-6-lower-alkyl-5-bromo-4-halophenoxypyrimidines, such as 2-amino-6-ethyl-5-bromo-4-phenoxypyrimidine;
2-amino-6-propyl-5-bromo-4-phenoxypyrimidine;
2-amino-6-tert-butyl-5-bromo-4-phenoxypyrimidine;
2-amino-6-octyl-5-bromo-4-phenoxypyrimidine;

and the like, and 2-amino-6-ethyl-5-bromo-4-(2,4-dichlorophenoxy) pyrimidine;
2-amino-6-propyl-5-bromo-4-(2,4-dichlorophenoxy) pyrimidine;
2-amino-6-tert-butyl-5-bromo-4-(2,4-dichlorophenoxy) pyrimidine;
2-amino-6-octyl-5-bromo-4-(2,4-dichlorophenoxy) pyrimidine;

and the like, is productive of 1,2-dihydro-1-hydroxy-2-imino-6-ethyl-5-bromo-4-phenoxypyrimidine;
1,2-dihydro-1-hydroxy-2-imino-6-propyl-5-bromo-4-phenoxypyrimidine;
1,2-dihydro-1-hydroxy-2-imino-6-tert-butyl-5-bromo-4-phenoxypyrimidine;
1,2-dihydro-1-hydroxy-2-imino-6-octyl-5-bromo-4-phenoxypyrimidine;

and the like, and 1,2-dihydro-1-hydroxy-2-imino-6-ethyl-5-bromo-4-(2,4-dichlorophenoxy)pyrimidine;
1,2-dihydro-1-hydroxy-2-imino-6-propyl-5-bromo-4-(2,4-dichlorophenoxy)pyrimidine;

1,2-dihydro-1-hydroxy-2-imino-6-tert-butyl-5-bromo-4-(2,4-dichlorophenoxy)pyrimidine;
1,2-dihydro-1-hydroxy-2-imino-6-octyl-5-bromo-4-(2,4-dichlorophenoxy)pyrimidine;

and the like, respectively.

Likewise, by reacting the appropriate 2-amino-6-lower-alkyl - 5 - chloro-4-phenoxypyrimidines and 2 - amino-6-lower-alkyl-5-chloro-4-halophenoxypyrimidines there are obtained the corresponding 1,2-dihydro-1-hydroxy-2-imino-6-lower-alkyl-5-chloro-4-phenoxypyrimidines and 1,2-dihydro - 1 - hydroxy - 2 - imino-6-lower-alkyl-5-chloro-4-halophenoxypyrimidines.

EXAMPLE 10

2-methyl-6-amino-4-(2,4-dichlorophenoxy)pyrimidine

A mixture of 26 g. (0.16 mole) of 2,4-dichlorophenol and 2.2 g. (0.055 mole) of 2-methyl-6-amino-4-chloropyrimidine was heated at 100° C. for 4 hours and a solution of 6.0 g. of sodium hydroxide and 150 ml. of water was added thereto. This mixture was stirred until homogeneous and filtered. The resulting solid was washed with water and recrystallized from 75 ml. of 30% ethanol to yield 1.7 g. (77% of theory) of 2-methyl-6-amino-4-(2,4-dichlorophenoxy)pyrimidine; M.P. 157°–158° C.

Analysis.—Calcd. for $C_{11}H_9Cl_2N_3O$ (percent): C, 48.91; H, 3.36; Cl, 26.25; N, 15.55. Found (percent): C, 48.61; H, 3.11; Cl, 25.92; N, 15.58.

U.V. (ethanol) 229 m$\mu$ ($\epsilon$=1700); sh. 265 m$\mu$ ($\epsilon$=3600); sh. 273 m$\mu$ ($\epsilon$=2700); sh. 281 m$\mu$ ($\epsilon$=1500). (0.01 N $H_2SO_4$) sh. 238 m$\mu$ ($\epsilon$=13,450); 266 m$\mu$ ($\epsilon$=6950); sh. 274 m$\mu$ ($\epsilon$=6750); sh. 281 m$\mu$ ($\epsilon$=5600). (0.01 N KOH) 228.5 m$\mu$ ($\epsilon$=17,850); sh. 265 m$\mu$ ($\epsilon$=3750); sh. 273 m$\mu$ ($\epsilon$=2800); sh. 281 m$\mu$ ($\epsilon$=1600).

I.R. (principal bands; mineral oil mull) 3440, 3300, 3100, 1650, 1595, 1570, 1260, 1235, 1180, 1100, 1010, 835, 825 cm.$^{-1}$.

By increasing the reaction temperature from 100° C. to 135° C. the yield of 2-methyl-6-amino-4-(2,4-dichlorophenoxy)pyrimidine, having a M.P. of 157°–158° C., was increased to 46% of theory.

Following the procedure of Example 10 but using in place of 2,4-dichlorophenol, phenol; p-chlorophenol; p-bromophenol; 2,4-dibromophenol; m-fluorophenol; 2,4,6-trichlorophenol, and the like, there are obtained 2-methyl-6-amino-4-phenoxypyrimidine;
2-methyl-6-amino-4-(p-chlorophenoxy)pyrimidine;
2-methyl-6-amino-4-(p-bromophenoxy)pyrimidine;
2-methyl-6-amino-4-(2,4-dibromophenoxy)pyrimidine;
2-methyl-6-amino-4-(m-fluorophenoxy)pyrimidine;
2-methyl-6-amino-4-(2,4,6-trichlorophenoxy)pyrimidine;

and the like, respectively.

Similarly substituting, for example,
2-ethyl-6-amino-4-chloropyrimidine;
2-propyl-6-amino-4-chloropyrimidine;
2-tert-butyl-6-amino-4-chloropyrimidine;
2-octyl-6-amino-4-chloropyrimidine;
2,5-dimethyl-6-amino-4-chloropyrimidine;
2-ethyl-5-methyl-6-amino-4-chloropyrimidine;
2-propyl-5-octyl-6-amino-4-chloropyrimidine;
2-propyl-5-tert-butyl-6-amino-4-chloropyrimidine;

and the like for 2-methyl-6-amino-4-chloropyrimidine, and following the procedure of Example 10, is productive of 2-ethyl-6-amino-4-(2,4-dichlorophenoxy)pyrimidine;
2-propyl-6-amino-4-(2,4-dichlorophenoxy)pyrimidine;
2-tert-butyl-6-amino-4-(2,4-dichlorophenoxy)pyrimidine;
2-octyl-6-amino-4-(2,4-dichlorophenoxy)pyrimidine;
2,5-dimethyl-6-amino-4-(2,4-dichlorophenoxy)pyrimidine;
2-ethyl-5-methyl-6-amino-4-(2,4-dichlorophenoxy)pyrimidine;
2-propyl-5-octyl-6-amino-4-(2,4-dichlorophenoxy)pyrimidine;
2-propyl-5-tert-butyl-6-amino-4-(2,4-dichlorophenoxy)pyrimidine;

and the like, respectively.

Also following the procedure of Example 10 but using in place of the combination of the 2-methyl-6-amino-4-chloropyrimidine and the 2,4-dichlorophenol, each of the 2 - lower-alkyl-6-amino-4-chloropyrimidines and 2,5-di-lower-alkyl-6-amino-4-chloropyrimidines described above, and each of the specific halophenols mentioned above, there are obtained the corresponding 2-lower-alkyl-6-amino-4-phenoxypyrimidines, 2 - lower-alkyl-6-amino-4-halophenoxypyrimidines, 2,5 - di-lower-alkyl-6-amino-4-phenoxypyrimidines and 2,5 - di-lower-alkyl-6-amino-4-halophenoxypyrimidines.

EXAMPLE 11

1,6-dihydro-1-hydroxy-2-methyl-6-imino-4-(2,4-dichlorophenoxy)pyrimidine

A solution of 4.5 g. (0.0175 mole) of 2-methyl-6-amino-4-(2,4-dichlorophenoxy)pyrimidine, 100 ml. of acetone and 30 ml. of ethanol was cooled to 0° C. and 6.0 g. (0.035 mole) of m-chloroperbenzoic acid was added thereto. This mixture was stirred for 3.5 hours and filtered. The filtrate was concentrated under reduced pressure to about 30 ml. and a solution of 1.3 g. of 85% potassium hydroxide and 300 ml. of water was added. The thus-obtained mixture was filtered, the solid washed with water and recrystallized from 200 ml. of acetonitrile to yield 3.5 g. (70% of theory) of 1,6-dihydro-1-hydroxy-2-methyl-6-imino - 4 - (2,4-dichlorophenoxy)pyrimidine; M.P. 214°–216° C.

U.V. (ethanol 229 m$\mu$ ($\epsilon$=46,550); sl. sh. 258 m$\mu$ ($\epsilon$=6950); 283 m$\mu$ ($\epsilon$=2700); 296 m$\mu$ ($\epsilon$=2150). (0.01 N $H_2SO_4$) 214 m$\mu$ ($\epsilon$=35,250); 221 m$\mu$ ($\epsilon$=35,150); sh. 228 m$\mu$ ($\epsilon$=34,000); sh. 259 m$\mu$ $\epsilon$=5950); sh. 265 m$\mu$ ($\epsilon$=5550); sh. 274 m$\mu$ ($\epsilon$=4850); sh. 281 m$\mu$ ($\epsilon$=3700). (0.01 N KOH) 229 m$\mu$ ($\epsilon$=44,600); sh. 260 m$\mu$ ($\epsilon$=7400); sh. 283 m$\mu$ ($\epsilon$=2900); 296 m$\mu$ ($\epsilon$=2300).

I.R. (principal bands; mineral oil mull) 3320, 3250, 3200, 1675, 1565, 1475, 1250, 1205, 870, 815 cm.$^{-1}$.

Following the procedure of Example 11 but using in place of m-chloroperbenzoic acid, in separate exeperiments, peracetic acid, perbenzoic acid, perphthalic acid, 2,4-dichloroperbenzoic acid, p-methylperbenzoic acid, m-nitroperbenzoic acid and p-methoxyperbenzoic acid, the same product, 1,6 - dihydro-1-hydroxy-2-methyl-6-imino-(2,4-dichlorophenoxy)pyrimidine is obtained.

Similarly, substituting, for example 2-ethyl-6-amino-4-(2,4-dichlorophenoxy)pyrimidine;
2-propyl-6-amino-4-(2-dichlorophenoxy)pyrimidine;
2-tert-butyl-6-amino-4-(2,4-dichlorophenoxy)pyrimidine;
2-octyl-6-amino-4-(2,4-dichlorophenoxy)pyrimidine;
2,5-dimethyl-6-amino-4-(2,4-dichlorophenoxy)pyrimidine;
2-ethyl-5-methyl-6-amino-4-(2,4-dichlorophenoxy)pyrimidine;
2-propyl-5-octyl-6-amino-4-(2,4-dichlorophenoxy)pyrimidine;
2-propyl-5-tert-butyl-6-amino-4-(2,4-dichlorophenoxy)pyrimidine, and the like, for 2-methyl-6-amino-4-(2,4-dichlorophenoxy)pyrimidine, and following the procedure of Example 11 is productive of 1,6-dihydro-1-hydroxy-2-ethyl-6-imino-4-(2,4-dichlorophenoxy)pyrimidine;
1,6-dihydro-1-hydroxy-2-propyl-6-imino-4-(2,4-dichlorophenoxy)pyrimidine;
1,6-dihydro-1-hydroxy-2-tert-butyl-6-imino-4-(2,4-dichlorophenoxy)pyrimidine;
1,6-dihydro-1-hydroxy-2-octyl-6-imino-4-(2,4-dichlorophenoxy)pyrimidine;
1,6-dihydro-1-hydroxy-2,5-dimethyl-6-imino-4-(2,4-dichlorophenoxy)pyrimidine;

1,6-dihydro-1-hydroxy-2-ethyl-5-methyl-6-imino-4-(2,4-dichlorophenoxy)pyrimidine;
1,6-dihydro-1-hydroxy-2-propyl-5-octyl-6-imino-4-(2,4-dichlorophenoxy)pyrimidine;
1,6-dihydro-1-hydroxy-2-propyl-5-tert-butyl-6-imino-4-(2,4-dichlorophenoxy)pyrimidine, and the like, respectively.

Also following the procedure of Example 11 but using in place of 2 - methyl-6-amino-4-(2,4-dichlorophenoxy)pyrimidine each of the other 2 - lower-alkyl-6-amino-4-phenoxypyrimidines, 2 - lower-alkyl-6-amino-4-halophenoxypyrimidines, 2,5-di-lower-alkyl - 6 - amino-4-phenoxypyrimidines, and 2,5 - di-lower-alkyl-6-amino-4-halophenoxypyrimidines, there are obtained the corresponding 1,6 - dihydro - 1 - hydroxy-2-lower-alkyl-6-imino-4-phenoxypyrimidines, 1,6 - dihydro-1-hydroxy-2-lower-alkyl-6-imino-4-halophenoxypyrimidines, 1,6-dihydro-1-hydroxy-2,5-di-lower-alkyl-6-imino-4-phenoxypyrimidines, and 1,6-dihydro-1-hydroxy-2,5-di-lower-lower-alkyl - 6 - imino-4-halophenoxypyrimidines.

EXAMPLE 12

2-methyl-6-amino-5-bromo-4-(2,4-dichlorophenoxy) pyrimidine

Following the procedure of Example 8, but substituting 2-methyl - 6 - amino-4-(2,4-dichlorophenoxy)pyrimidine for 2-amino - 6 - methyl-4-(2,4,-dichlorophenoxy)pyrimidine is productive of 2-methyl-6-amino-5-bromo-4-(2,4-dichlorophenoxy)pyrimidine.

Following the procedure of Example 8, making the same substitution, and in addition, substituting N-chlorosuccinimide for N-bromosuccinimide there is obtained the corresponding 2-methyl-6-amino-5-chloro-4-(2,4-dichlorophenoxy)pyrimidine.

Also following the procedure of Example 8, but substituting other 2-lower-alkyl-6-amino-4-phenoxypyrimidines and 2-lower-alkyl-6-amino-4-halophenoxypyrimidines, such as 2-ethyl-6-amino-4-phenoxypyrimidine;
2-propyl-6-amino-4-phenoxypyrimidine;
2-tert-butyl-6-amino-4-phenoxypyrimidine;
2-octyl-6-amino-4-phenoxypyrimidine;

and the like, and 2-ethyl-6-amino-4-(2,4-dichlorophenoxy)pyrimidine;
2-propyl-6-amino-4-(2,4-dichlorophenoxy)pyrimidine;
2-tert-butyl-6-amino-4-(2,4-dichlorophenoxy)pyrimidine;
2-octyl-6-amino-4-(2,4-dichlorophenoxy)pyrimidine;

and the like, for 2-amino-6-methyl-4-(2,4-dichlorophenoxy)pyrimidine there are obtained the corresponding 5-compounds, such as, 2-ethyl-6-amino-5-bromo-4-phenoxypyrimidine;
2-propyl-6-amino-5-bromo-4-phenoxypyrimidine;
2-tert-butyl-6-amino-5-bromo-4-phenoxypyrimidine;
2-octyl-6-amino-5-bromo-4-phenoxypyrimidine;

and the like, and 2-ethyl-6-amino-5-bromo-4-(2,4-dichlorophenoxy) pyrimidine;
2-propyl-6-amino-5-bromo-4-(2,4-dichlorophenoxy) pyrimidine;
2-tert-butyl-6-amino-5-bromo-4-(2,4-dichlorophenoxy) pyrimidine;
2-octyl-6-amino-5-bromo-4-(2,4-dichlorophenoxy) pyrimidine, and the like, respectively.

Likewise, by reacting the appropriate 2-lower-alkyl-6-amino-4-phenoxypyrimidines and 2-lower-alkyl-6-amino-4-halophenoxypyrimidines with N-chlorosuccinimide there are obtained 2-lower-alkyl-6-amino-5-chloro-4-phenoxypyrimidines and 2-lower-alkyl-6-amino-5-chloro-4-halophenoxypyrimidines.

EXAMPLE 13

1,6-dihydro-1-hydroxy-2-methyl-6-imino-5-bromo-4-(2,4-dichlorophenoxy)pyrimidine Following the procedure of Example 9, but substituting 2-methyl - 6 - amino-5-bromo-4-(2,4-dichlorophenoxy)pyrimidine for 2-amino-6-methyl-5-bromo-4-(2,4-dichlorophenoxy)pyrimidine is productive of 1,6-dihydro-1-hydroxy - 2 - methyl-6-imino-5-bromo-4-(2,4-dichlorophenoxy)pyrimidine.

Following the procedure of Example 9 making the same substitution, and in addition, substituting in place of m-chloroperbenzoic acid, in separate experiments, peracetic acid; perbenzoic acid; perphthalic acid; 2,4-dichloroperbenzoic acid; p-methylperbenzoic acid; m-nitroperbenzoic acid; and p-methoxyperbenzoic acid, the same product, 1,6 - dihydro-1-hydroxy - 2 - methyl-6-imino-5-bromo-4-(2,4-dichlorophenoxy)pyrimidine, is obtained.

Also following the procedure of Example 9 but substituting other 2-lower-alkyl-6-amino-5-bromo-4-phenoxypyrimidines and 2-lower-alkyl-6-amino-5-bromo-4-halophenoxy-pyrimidines, such as 2-ethyl-6-amino-5-bromo-4-phenoxypyrimidine;
2-propyl-6-amino-5-bromo-4-phenoxypyrimidine;
2-tert-butyl-6-amino-5-bromo-4-phenoxypyrimidine;
2-octyl-6-amino-5-bromo-4-phenoxypyrimidine;

and the like, and 2-ethyl-6-amino-5-bromo-4-(2,4-dichlorophenoxy) pyrimidine;
2-propyl-6-amino-5-bromo-4-(2,4-dichlorophenoxy) pyrimidine;
2-tert-butyl-6-amino-5-bromo-4-(2,4-dichlorophenoxy) pyrimidine;
2-octyl-6-amino-5-bromo-4-(2,4-dichlorophenoxy) pyrimidine, and the like, is productive of 1,6-dihydro-1-hydroxy-2-ethyl-6-imino-5-bromo-4-phenoxypyrimidine;
1,6-dihydro-1-hydroxy-2-propyl-6-imino-5-bromo-4-phenoxypyrimidine;
1,6-dihydro-1-hydroxy-2-tert-butyl-6-imino-5-bromo-4-phenoxypyrimidine;
1,6-dihydro-1-hydroxy-2-octyl-6-imino-5-bromo-4-phenoxypyrimidine;

and the like, and 1,6-dihydro-1-hydroxy-2-ethyl-6-imino-5-bromo-4-(2,4-dichlorophenoxy)pyrimidine;
1,6-dihydro-1-hydroxy-2-propyl-6-imino-5-bromo-4-(2,4-dichlorophenoxy)pyrimidine;
1,6-dihydro-1-hydroxy-2-tert-butyl-6-imino-5-bromo-4-(2,4-dichlorophenoxy)pyrimidine;
1,6-dihydro-1-hydroxy-2-octyl-6-imino-5-bromo-4-(2,4-dichlorophenoxy)pyrimidine;

and the like, respectively.

Likewise, by reacting the appropriate 2-lower-alkyl-6-amino-5-chloro-4-phenoxypyrimidines and 2-lower-alkyl-6-amino-5-chloro - 4 - (2,4-dichlorophenoxy)pyrimidines, there are obtained the corresponding 1,6-dihydro-1-hydroxy-2-lower-alkyl-6-imino - 5 - chloro-4-phenoxypyrimidines and 1,6-dihydro-1-hydroxy-2-lower-alkyl-6-imino-5-chloro-4-halophenoxypyrimidines.

What is claimed is:

1. A compound selected from the group consisting of the compounds of the formulas:

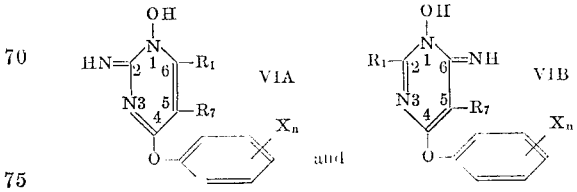

wherein $R_1$ is lower alkyl, $R_7$ is selected from the group consisting of hydrogen, lower alkyl, bromine, and chlorine, X is selected from the group consisting of fluorine, chlorine, and bromine, and $n$ is zero to 3, inclusive.

2. 1,2 - dihydro - 1 - hydroxy - 2 - imino - 6 - methyl-4-phenoxypyrimidine, the compound of Formula VIA of claim 1 where $R_1$ is methyl, $R_7$ is hydrogen and $n$ is zero.

3. 1,2 - dihydro - 1 - hydroxy - 2 - imino - 6 - methyl-4-(2,4-dichlorophenoxy)pyrimidine, the compound of Formula VIA of claim 1 where $R_1$ is methyl, $R_7$ is hydrogen, X is chlorine and $n$ is 2.

4. 1,2 - dihydro - 1 - hydroxy - 2 - imino - 5,6 - dimethyl - 4 - (2,4-dichlorophenoxy)pyrimidine, the compound of Formula VIA of claim 1 where $R_1$ and $R_7$ are methyl, X is chlorine and $n$ is 2.

5. 1,2 - dihydro - 1 - hydroxy - 2 - imino - 6 - methyl-5 - bromo - 4 - (2,4-dichlorophenoxy)pyrimidine, the compound of Formula VIA of claim 1 where $R_1$ is methyl, $R_7$ is bromo, X is chlorine and $n$ is 2.

6. 1,6 - dihydro - 1 - hydroxy - 2 - methyl - 6 - imino-4 - (2,4-dichlorophenoxy)pyrimidine, the compound of Formula VIB of claim 1 where $R_1$ is methyl, $R_7$ is hydrogen, X is chlorine and $n$ is 2.

References Cited
UNITED STATES PATENTS 3,464,987  9/1969  Ursprung et al. ____ 260—256.4

ALEX MAZEL, Primary Examiner

R. J. GALLAGHER, Assistant Examiner

UNITED STATES PATENT OFFICE
CERTIFICATE OF CORRECTION

Patent No. 3,639,667         Dated February 1, 1972

Inventor(s) Joseph J. Ursprung and William C. Anthony

It is certified that error appears in the above-identified patent and that said Letters Patent are hereby corrected as shown below:

Column 2, line 3, for "on" read -- one --. Column 2, lines 11-12, for "  " read --  --. Column 3, line 30, for " " read -- ↓③ --. Column 3, line 55, for "H" read -- N --. Column 4, line 15, for " ⟶ " read -- ⟵ --. Column 4, line 23, for "IIIIA." read -- IIIA. --. Column 7, line 43, for "water-soluble" read -- water-insoluble --. Column 9, line 21, for "suitable" read -- suitably --.

Column 13, line 14, for "21,800" read -- 21,880 --. Column 14, line 1, for "208° C." read -- 208.5° C. --. Column 17, line 24, for "77%" read -- 11% --. Column 18, line 52, for "2-dichlorophenoxy" read -- 2,4-dichlorophenoxy --. Column 19, line 19, for "di-lower-lower-alkyl-" read -- di-lower-alkyl- --. Column 19, line 52, for "5- compounds" read -- 5-bromo compounds --.

Signed and sealed this 26th day of December 1972.

(SEAL)
Attest:

EDWARD M. FLETCHER, JR.
Attesting Officer

ROBERT GOTTSCHALK
Commissioner of Patents